(12) United States Patent
Kim et al.

(10) Patent No.: US 11,940,693 B2
(45) Date of Patent: Mar. 26, 2024

(54) DISPLAY DEVICE

(71) Applicant: LG Display Co., Ltd., Seoul (KR)

(72) Inventors: Da-Young Kim, Seoul (KR);
Jaehyoung Park, Gimpo-si (KR);
Woojin Sim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/946,018

(22) Filed: Sep. 15, 2022

(65) Prior Publication Data

US 2023/0106837 A1 Apr. 6, 2023

(30) Foreign Application Priority Data

Sep. 29, 2021 (KR) .................. 10-2021-0128624

(51) Int. Cl.
*G02F 1/13357* (2006.01)
*C08G 77/12* (2006.01)

(52) U.S. Cl.
CPC ........ *G02F 1/133611* (2013.01); *C08G 77/12* (2013.01); *G02F 1/133603* (2013.01); *G02F 1/133605* (2013.01); *G02F 1/133608* (2013.01); *G02F 2201/50* (2013.01); *G02F 2202/10* (2013.01)

(58) Field of Classification Search
CPC ......... G02F 1/133611; G02F 1/133603; G02F 1/133605; G02F 1/133608; G02F 1/133388; G02F 1/133606; G02F 1/133607; G02F 1/133609; G02F 2201/50; G02F 2202/10; G02B 6/002; G02B 6/0041; G02B 5/0247; G02B 5/0242; C08G 77/12; C08G 77/16
See application file for complete search history.

(56) References Cited

U.S. PATENT DOCUMENTS

| | | | |
|---|---|---|---|
| 9,899,579 B2 | 2/2018 | Butterworth | |
| 2008/0081174 A1* | 4/2008 | Lee | G02F 1/133606 427/245 |
| 2009/0279313 A1* | 11/2009 | Teragawa | G02B 5/0247 428/188 |
| 2011/0199788 A1* | 8/2011 | Park | G02F 1/133603 362/249.02 |
| 2013/0235577 A1* | 9/2013 | Park | G02B 6/0051 362/235 |
| 2016/0260872 A1 | 9/2016 | Butterworth | |
| 2020/0192014 A1* | 6/2020 | Yoon | G02B 6/0055 |
| 2021/0116750 A1* | 4/2021 | Kim | G02F 1/133603 |

FOREIGN PATENT DOCUMENTS

KR 10-2016-0083910 A 7/2016

* cited by examiner

*Primary Examiner* — Erin Kryukova
(74) *Attorney, Agent, or Firm* — Fenwick & West LLP

(57) ABSTRACT

The present disclosure relates to a display device, and more particularly, a display device comprises: a plurality of light sources; a resin layer disposed to cover the plurality of light sources; and a display panel disposed on the resin layer and including a display area and a non-display area, wherein the resin layer comprises: a first region configured to overlap the display area; and a second region configured to overlap the non-display area, and wherein a plurality of fine holes are provided in at least a part of the second region. Therefore, the decomposed materials, which are produced by the decomposition of the backlight unit and the components around the backlight unit in a high-temperature, high-humidity environment, may be discharged through the fine holes.

21 Claims, 6 Drawing Sheets

DISPLAY DEVICE

CROSS-REFERENCE TO RELATED APPLICATIONS

This application claims the priority of Korean Patent Application No. 10-2021-0128624 filed on Sep. 29, 2021, in the Korean Intellectual Property Office, the disclosure of which is incorporated herein by reference.

FIELD

The present disclosure relates to a display device, and more particularly, to a display device that provides high-reliability characteristics by minimizing deterioration in brightness in a high-temperature, high-humidity environment.

DESCRIPTION OF THE RELATED ART

A liquid crystal display (LCD) is lightweight and thin and requires low power consumption, and thus the range of application of the liquid crystal display is wide. The liquid crystal display displays images by adjusting a light transmittance rate of liquid crystals by using an electric field. To this end, the liquid crystal display displays desired images on a screen by adjusting the light transmittance rate in response to image signals applied to a plurality of controlling switches and liquid crystals arranged in a matrix shape. Because the liquid crystal display is not a self-luminance display device, the liquid crystal display is equipped with a backlight unit that provides light to a rear surface of a liquid crystal display panel on which images are displayed.

A light-emitting diode (LED) is widely used as a light source for the backlight unit, and the light-emitting diode advantageously has a small scale and high reliability and requires low power consumption.

Based on the arrangement shape of the light source, the types of backlight units may be broadly classified into a direct light type backlight unit configured to emit light to a liquid crystal panel from a plurality of light sources installed immediately below a liquid crystal display, and an edge light type backlight unit configured to transmit light to a liquid crystal panel from a plurality of light sources installed on a sidewall of a light guide plate. The direct light type backlight unit may improve uniformity and brightness of light emitted to the panel and implement an excellent contrast ratio through dimming driving.

SUMMARY

Among the backlight unit and the components around the backlight unit, some components vulnerable to heat or moisture may be decomposed in a high-temperature, high-humidity environment. There is a problem in that brightness deteriorates as the components are decomposed as described above. In particular, when the display device is actually used, heat generated from the plurality of light sources is added, and the deterioration in brightness may be accelerated.

In addition, the resin layer is formed through a molding process to cover the plurality of light sources in order to protect and flatten the plurality of light sources provided in the backlight unit. The decomposed materials formed by the decomposition of the components denaturize the resin layer, which causes deterioration in brightness and corrosion of the light source that leads to lighting defects.

An object to be achieved by the present disclosure is to provide a display device capable of implementing excellent reliability by suppressing deterioration in brightness in a high-temperature, high-humidity environment.

Another object to be achieved by the present disclosure is to inhibit a material decomposed in a high-temperature, high-humidity environment from denaturizing the resin layer. Still another object to be achieved by the present disclosure is to solve a problem of a defect of the display device caused by a decomposed material.

Objects of the present disclosure are not limited to the above-mentioned objects, and other objects, which are not mentioned above, can be clearly understood by those skilled in the art from the following descriptions.

According to an aspect of the present disclosure, a display device includes: a plurality of light sources; a resin layer disposed to cover the plurality of light sources; and a display panel disposed on the resin layer and including a display area and a non-display area, in which the resin layer includes: a first region configured to overlap the display area; and a second region configured to overlap the non-display area, and in which a plurality of fine holes are provided in at least a part of the second region.

According to another aspect of the present disclosure, a display device includes: a backlight unit comprising a light source, and a flattening resin layer covering the light source; and a display panel disposed on the resin layer and including a display area and a non-display area, wherein the resin layer comprises a first region configured to overlap the display area and a second region configured to overlap the non-display area, a plurality of fine holes being provided in the second region.

Other detailed matters of the exemplary embodiments are included in the detailed description and the drawings.

The present disclosure provides breathability as the plurality of fine holes are provided in the second region of the resin layer corresponding to the non-display area. Therefore, the decomposed materials, which are produced by the decomposition of the backlight unit and the components around the backlight unit in a high-temperature, high-humidity environment, may be discharged through the fine holes without remaining in the backlight unit. Therefore, it is possible to suppress the additional denaturization and corrosion caused by the decomposed materials and minimize increases in yellowing or haze, thereby providing the display device having excellent reliability.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
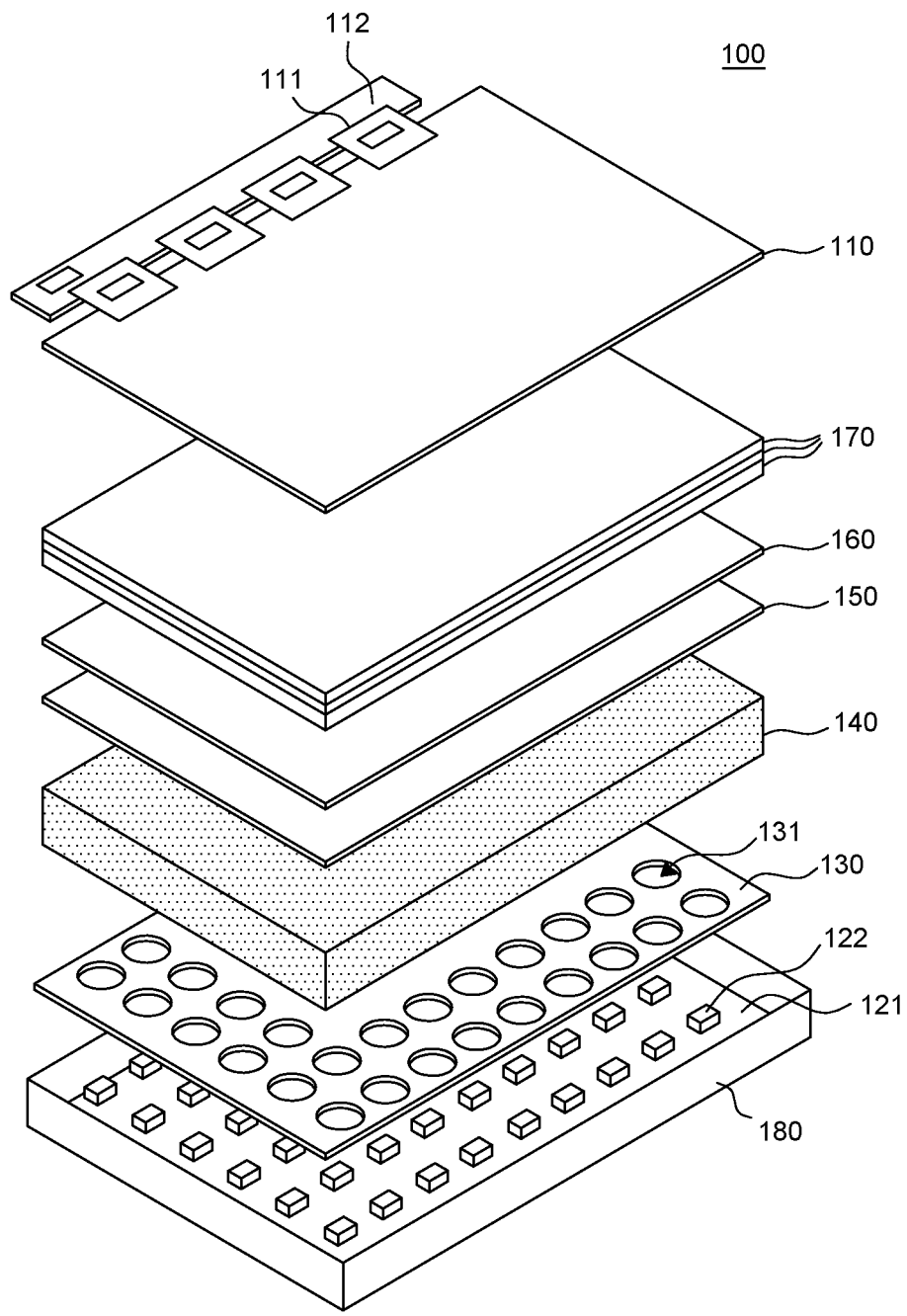
FIG. 1 is an exploded perspective view of a display device according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Unless otherwise particularly specified throughout the specification, a porosity (unit: %) is a value calculated by measuring free volume of a specimen through positron annihilation lifetime spectroscopy (PAL). First, polydimethylsiloxane, which was a contrastive specimen, was prepared (thickness of 1 mm), and the free volume was measured by using a Na-22 source as a positron generation source. Next, a moisture absorption rate of the specimen was measured at room temperature and in an atmospheric pressure condition. The moisture absorption rate was calculated by using the following equation.

$$\text{Moisture absorption rate (\%)} = \frac{m2 - m1}{m1} \times 100$$

(In the equation, m1 represents a weight of a dried specimen, and m2 represents a weight of the specimen that has maximally absorbed moisture.)

A moisture absorption rate of a comparative specimen was measured under the same condition. Based on the value of the free volume of the contrastive specimen, the free volume was calculated by comparing the moisture absorption rate of the contrastive specimen and the moisture absorption rate of the comparative specimen.

Unless otherwise particularly specified throughout the specification, a moisture vapor transmittance rate (unit: $gcm^{-1}s^{-1}\ cmHg^{-1}$) is a value measured by a standard weight measurement method based on ASTM E96 standard at room temperature and atmospheric pressure under a condition of relative humidity of 50%. Specifically, the measurement was performed as follows. First, a circular specimen having a diameter of 10 cm and a thickness of 1 mm was manufactured and then left unattended for four days at room temperature and atmospheric pressure under a condition of relative humidity of 50%. Next, the moisture vapor transmittance rate with respect to a moisture gradient of the specimen was measured by using a moisture permeable cup containing silica gel.

Unless otherwise particularly specified throughout the specification, a water contact angle is a value measured at room temperature (20° C. to 25° C.)

Hereinafter, the present disclosure will be described with reference to the drawings.

Figure 2:
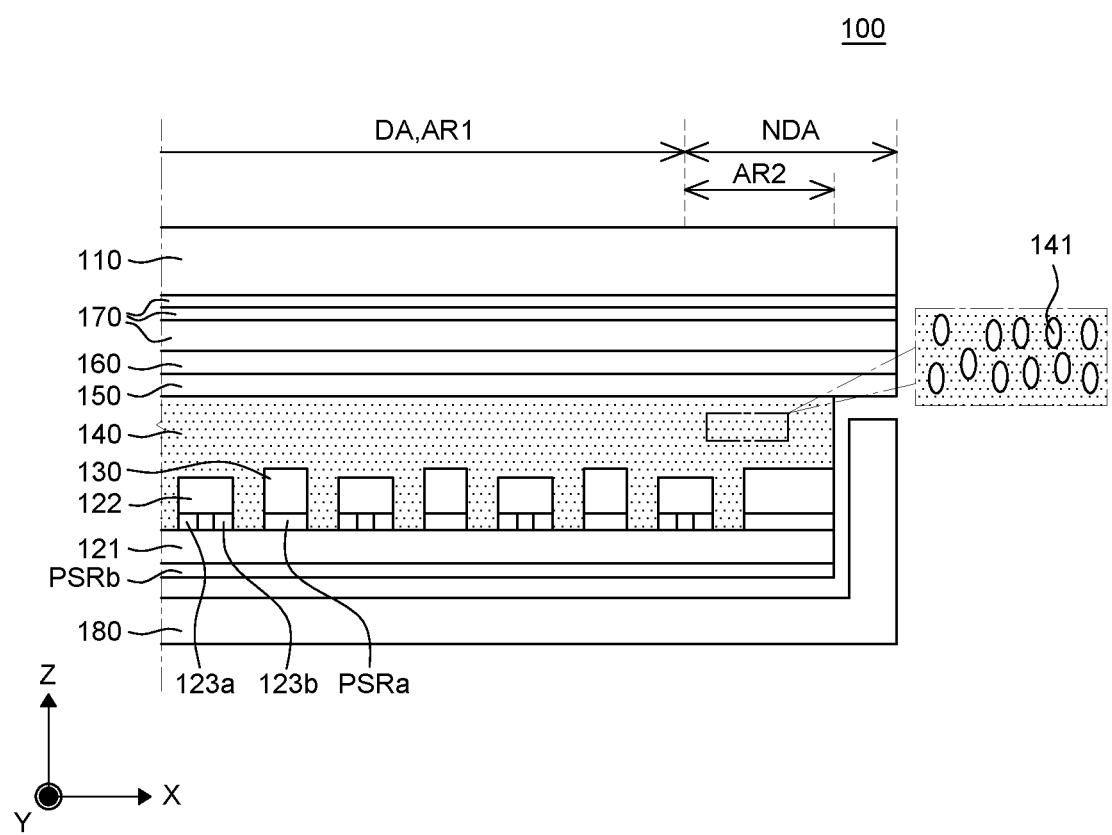
FIG. 2 is an enlarged cross-sectional view of the display device according to the embodiment of the present disclosure.
Figure 3:
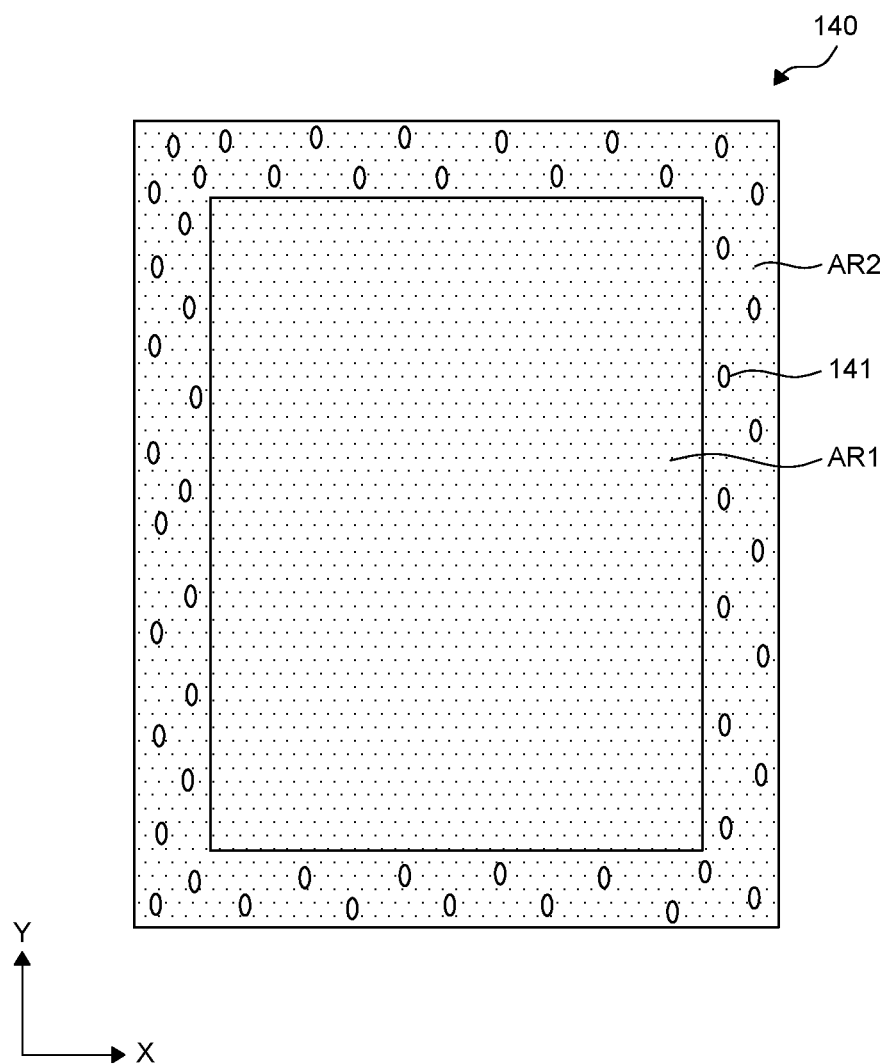
FIG. 3 is a top plan view of a resin layer according to the embodiment of the present disclosure.

FIG. 1 is an exploded perspective view of a display device according to an embodiment of the present disclosure. FIG. 2 is an enlarged cross-sectional view of the display device according to the embodiment of the present disclosure. FIG. 3 is a top plan view of a resin layer according to the embodiment of the present disclosure.

First, referring to FIGS. 1 and 2, a display device 100 according to an embodiment of the present disclosure includes a display panel 110, a printed circuit board 121, light sources 122, an optimal reflective plate 130, a resin layer 140, an optimal protective film 150, an optimal diffusion plate 160, an optimal optical sheet 170, and an optimal bottom cover 180. The printed circuit board 121 (which is not the focus of the present application), the light source 122, the optimal reflective plate 130, the resin layer 140, and the optimal diffusion plate 160 may be configured as a single constituent element and called a backlight unit. In FIG. 2, the X-axis, Y-axis, and Z-axis directions correspond to the width, length, and thickness directions of the display panel or the resin layer.

The display panel 110 is a panel configured to display image. The display panel 110 has a display area DA and a non-display area NDA. The display area DA is an area in which a plurality of pixels are disposed to display the image. The pixels including light-emitting areas for displaying the image may be disposed in the display area DA, and driving elements for operating the pixels may be disposed in the display area DA. As an example, the non-display area NDA surrounds a periphery of the display area DA, but the arrangement of the non-display area is not limited thereto; for example, the non-display area may be disposed on one or more sides of the display area. The non-display area NDA is an area that is covered by light-blocking members and thus does not substantially display the image. Various lines, drive ICs, and the like for operating the pixels and the driving elements disposed in the display area DA may be disposed in the non-display area NDA.

For example, the display panel 110 may be a liquid crystal display panel that displays images by using light emitted from the backlight unit to the display panel 110 and by adjusting a light transmittance rate while changing the arrangement of the liquid crystals included in the liquid crystal layer of the display panel 110. The display panel 110 includes a lower substrate, a liquid crystal layer disposed on the lower substrate, and an upper substrate disposed on the liquid crystal layer.

The pixels are defined as a plurality of gate lines and a plurality of data lines intersect one another on the lower substrate. A thin-film transistor is provided at each intersection point of each of the pixels and connected to a pixel electrode formed in each of the pixels.

A common electrode forms an electric field together with the pixel electrode and controls the liquid crystal. Depending upon a method of controlling the orientation of the liquid crystals on the liquid crystal layer, the common electrode is formed on the lower substrate or the upper substrate. For example, when the liquid crystal is controlled in a twisted nematic (TN) mode, a vertical alignment (VA) mode, or the like, the common electrode is disposed on the upper substrate, and the pixel electrode and the common electrode form a vertical electric field, thereby controlling the liquid crystal. When the liquid crystal is controlled in a fringe field switching (FFS) mode, an in-plane switching (IPS) mode, or the like, the common electrode is disposed on the lower substrate, and the pixel electrode and the common electrode form a horizontal electric field, thereby controlling the liquid crystal.

Color filters and black matrices are disposed on the upper substrate. The light emitted from the backlight unit is converted into light beams with various colors while passing through the liquid crystal layer and the color filter between the lower substrate and the upper substrate. Therefore, full-color images are displayed. The black matrix may cover a gate line, a data line, or a thin-film transistor disposed on the lower substrate so that the gate line, the data line, or the thin-film transistor are not visible.

The liquid crystal layer is disposed between the upper substrate and the lower substrate. Alignment layers may be disposed on upper and lower portions of the liquid crystal layer and determine an initial arrangement direction of molecules of the liquid crystals. In addition, a side sealant may be formed along the edges of the upper and lower substrates in order to suppress leak of the liquid crystal layer.

In addition, although not illustrated in FIG. 1, polarizing plates may be disposed on front and rear surfaces of the display panel 110.

A drive part 112 for operating the display panel 110 is disposed along one side of the display panel 110. The drive part 112 includes various ICs such as a gate driver IC or a data driver IC, and various drive circuits. The drive part 112 operates the display panel 110 by applying signals to the gate line and the data line. In this case, the drive part 112 is electrically connected to the display panel 110 through a connection member 111. For example, the connection member 111 may be a chip-on-film (COF), a tape carrier package (TCP), or the like.

Therefore, when the thin-film transistor connected to the gate line is turned on in response to an on/off signal for the thin-film transistor transmitted through the gate line in the display panel 110, an image signal of the data line is transmitted to the corresponding pixel electrode. Therefore, the arrangement of the liquid crystals is changed by the generated electric field between the pixel electrode and the common electrode, such that the transmittance rate varies.

The backlight unit supplies the light to the display panel 110. The backlight unit includes the plurality of light sources 122, the printed circuit board 121, the reflective plate 130, the resin layer 140, and the diffusion plate 160. The backlight unit is a direct light type backlight unit, and the plurality of light sources 122 are disposed at a lower side of the display panel 110.

In the case of the direct light type backlight unit, the plurality of light sources 122 are directed toward the display panel 110, such that a relatively large number of light sources 122 are disposed in comparison with an edge light type backlight unit. Further, in the direct light type backlight unit, the plurality of light sources 122 may independently operate. Therefore, the direct light type backlight unit may implement an excellent contrast ratio through local dimming driving. In addition, the direct light type backlight unit may implement a high-brightness dynamic image through the high dynamic range (HDR) driving that increases a contrast ratio between a bright screen and a dark screen by further increasing brightness of the light source 122 corresponding to a region in which a bright screen.

When a voltage is applied to the light source 122, the light source 122 emits light. For example, the plurality of light sources 122 may each be a light-emitting diode (LED). The light source 122, which is the LED, may be a mini-LED having a size at a level of several hundreds of micrometers or a micro-LED having a size at a level of several tens of micrometers.

The light sources 122 emit light beams with various colors in accordance with the type of light sources. Specifically, the light sources 122 include a red light source configured to emit red light, a green light source configured to emit green light, a blue light source configured to emit blue light, and a white light source configured to emit white light.

The plurality of light sources 122 are mounted on the printed circuit board 121. The printed circuit board 121 is electrically connected to the plurality of light sources 122 and applies voltages to the light sources 122. When the light source 122 is an LED, the light sources 122 mounted on the printed circuit board 121 may emit light by combining electrons and positive holes supplied from first and second electrode 123a and 123b.

Solder resists (SR) may be formed on front and rear surfaces of the printed circuit board 121. The solder resist may protect the circuit formed on the printed circuit board 121. During a process of manufacturing the backlight unit, the solder resist may suppress a solder bridge between the adjacent circuits. For example, the upper solder resist PSRa may be disposed on the front surface of the printed circuit board 121, and a lower solder resist PSRb may be disposed on the rear surface of the printed circuit board 121. In this case, the upper solder resist PSRa may be patterned to be formed only in a region except for a region in which the light sources 122 are to be disposed.

The reflective plate 130 is disposed on the printed circuit board 121. The reflective plate 130 entirely reflects the light from the light source 122. The reflective plate 130 includes a plurality of through-holes 131 through which the plurality of light sources 122 may pass, respectively. The reflective plate 130 may be patterned in the same shape as the upper solder resist PSRa. That is, the reflective plate 130 is disposed to cover the entire upper solder resist PSRa, except for the plurality of light sources 122. Therefore, the light, which is directed toward a rear surface or a side surface of the light source 122 without being directed toward a front surface on which the optical sheet 170 is disposed, is reflected toward the optical sheet 170, such that the brightness of light entering the display panel 110 is increased. In addition, the reflective plate 130 may suppress the Halo-Mura phenomenon in which the light is diffused and dispersed even though only some of the plurality of light sources 122 are turned on.

The reflective plate 130 may be attached to the upper solder resist PSRa by means of an adhesive member.

A height from the top surface of the printed circuit board 121 to an uppermost end of the light source 122 may be lower than a height from the top surface of the printed circuit board 121 to an uppermost end of the reflective plate 130. That is, the top surface of the light source 122 may not protrude to the outside of the reflective plate 130. If the light source 122 protrudes to the outside of the reflective plate 130, a directional angle of light may increase, which may cause leakage of light. In particular, like the local dimming driving or the HDR driving, when only some of the plurality of light sources 122 operate, the light emitted from the light source 122 having a wide directional angle may be diffused even to another region. Therefore, the Halo-Mura phenomenon may occur. Therefore, the top surface of the light source 122 is formed to be lower than the top surface of the reflective plate 130 so that the light source 122 does not protrude to the outside of the reflective plate 130, thereby suppressing the Halo-Mura phenomenon.

The resin layer 140 is disposed on the reflective plate 130. The resin layer 140 is thicker than the light source 122 and the reflective plate 130 in order to cover the light source 122 and the reflective plate 130. In addition, the resin layer 140 flattens a surface on which the plurality of light sources 122 and the reflective plate 130 are disposed. That is, the resin layer 140 is configured to cover the entire surface on which the plurality of light sources 122 and the reflective plate 130 are disposed. Therefore, the resin layer 140 may physically/chemically protect the plurality of light sources 122. In addition, the resin layer 140 may suppress a loss of light by minimizing a gradient of a refractive index on an optical path.

In addition, the resin layer 140 fixes the plurality of light sources 122 and supports the optical sheet 170 positioned above the light source 122. Therefore, an optical gap may be defined between the light source 122 and the optical sheet 170. The optical gap is a spacing distance between the optical sheet 170 and the light source 122. The optical gap is a region in which the light beams emitted from the adjacent light sources 122 are superimposed and mixed. The Spot Mura phenomenon may occur in a case in which the optical gap is not ensured. That is, as the optical gap decreases, the light emitted from the light source 122 is concentrated on an upper center portion of the light source 122, and the light beams emitted from the adjacent light sources 122 cannot be superimposed, such that a dark zone is formed. That is, the resin layer 140 needs to have a sufficient thickness in order to ensure the optical gap. Therefore, the spot shaped light source 122 is not visible, and the light beams emitted from the adjacent light sources 122 are superimposed and serve as a surface-shaped light source.

The protective film 150 is disposed on the resin layer 140. That is, the resin layer 140 is formed to fill spaces between the protective film 150 and the plurality of light sources 122. The protective film 150 protects the resin layer 140. The protective film 150 may be made of a material having high transparency so as not to degrade the brightness of the light emitted from the light source 122. For example, the protective film 150 may be a polyethylene terephthalate film. However, the present disclosure is not limited thereto.

The resin layer 140 may be made of transparent silicon-based resin so as not to degrade the brightness of the light emitted from the light source 122. The silicon-based resin may be easily used to form a target shape and easily adjusted in physical properties. Therefore, the silicon-based resin may protect the plurality of light sources 122 and easily support the optical sheet 170. In addition, the silicon-based resin has a high refractive index of 1 or more, thereby maintaining high efficiency in extracting the light emitted from the light source 122.

The resin layer 140 has a first region AR1 and a second region AR2. The first region AR1 overlaps the display area DA of the display panel 110. The second region AR2 overlaps the non-display area NDA of the display panel 110. Therefore, the second region AR2 is formed to surround the first region AR1, equally or similarly to the non-display area NDA. That is, the second region AR2 has a frame shape so as to surround the first region AR1.

The resin layer 140 includes a plurality of fine holes 141 in at least a part region of the second region AR2. Some of the components at the periphery of the resin layer 140 may be decomposed in a high-temperature, high-humidity environment. In particular, the components such as the upper solder resist PSRa and the protective film 150 made of an organic material may be decomposed by heat or moisture. Various decomposed materials (moisture vapor, alcohol, acid, and the like), which are produced by the decomposition of the organic material, increase yellowing and haze, which degrades brightness and display quality. In addition, if the decomposed materials remain in the backlight unit without being discharged, the decomposed materials corrode the light source 122, the printed circuit board 121, and the like, which causes lighting defect. In addition, the decomposed materials denaturize the resin layer 140, the upper solder resist PSRa, the protective film 150, and the like, which causes deterioration in reliability of the display device. In particular, when the display device is actually used, heat generated from the components such as the light source 122 is added. For this reason, the decomposition and the denaturization and corrosion caused by the decomposed material accelerate, which further deteriorates reliability.

The display device 100 according to the embodiment of the present disclosure includes the plurality of fine holes 141 in the second region AR2 of the resin layer 140, such that the decomposed materials may be discharged through the fine holes 141 without remaining in the backlight unit. Therefore, the denaturization and corrosion of the components caused by the decomposed materials may be minimized.

For example, an average diameter of the plurality of fine holes 141 may be 1 nm to 10 μm or 1 nm to 500 nm. When the average diameter of the fine holes 141 is within the range, the high light extraction efficiency may be maintained, such that the brightness and display quality may be excellent, and the discharge of decomposed materials may be facilitated. If the average diameter of the fine holes 141 is as large as several hundreds of micrometers or more, the brightness and reliability may deteriorate.

The fine holes 141 may be formed only in the second region AR2 that overlaps the non-display area DA. As described above, the resin layer 140 is made of silicon-based resin having a high refractive index in order to maintain high brightness. However, a refractive index of the portion having the fine holes 141 is low. The light extraction efficiency may deteriorate because of a difference in refractive index between the portion having the fine holes 141 and the portion having no fine hole. Therefore, in a case in which the fine holes 141 formed in the first region AR1 that overlaps the display area DA, the brightness and display quality of the display device 100 may deteriorate. In the display device 100 according to the embodiment of the present disclosure, the fine holes 141 are formed in the second region AR2 of the resin layer 140, such that the display quality may be kept high without being degraded.

Referring to FIG. 3, the plurality of fine holes 141 may be uniformly distributed in the entire second region AR2 having a frame shape. However, the present disclosure is not limited thereto. The plurality of fine holes 141 may be formed along at least one side among the four sides that define the second region AR2.

Figure 4:
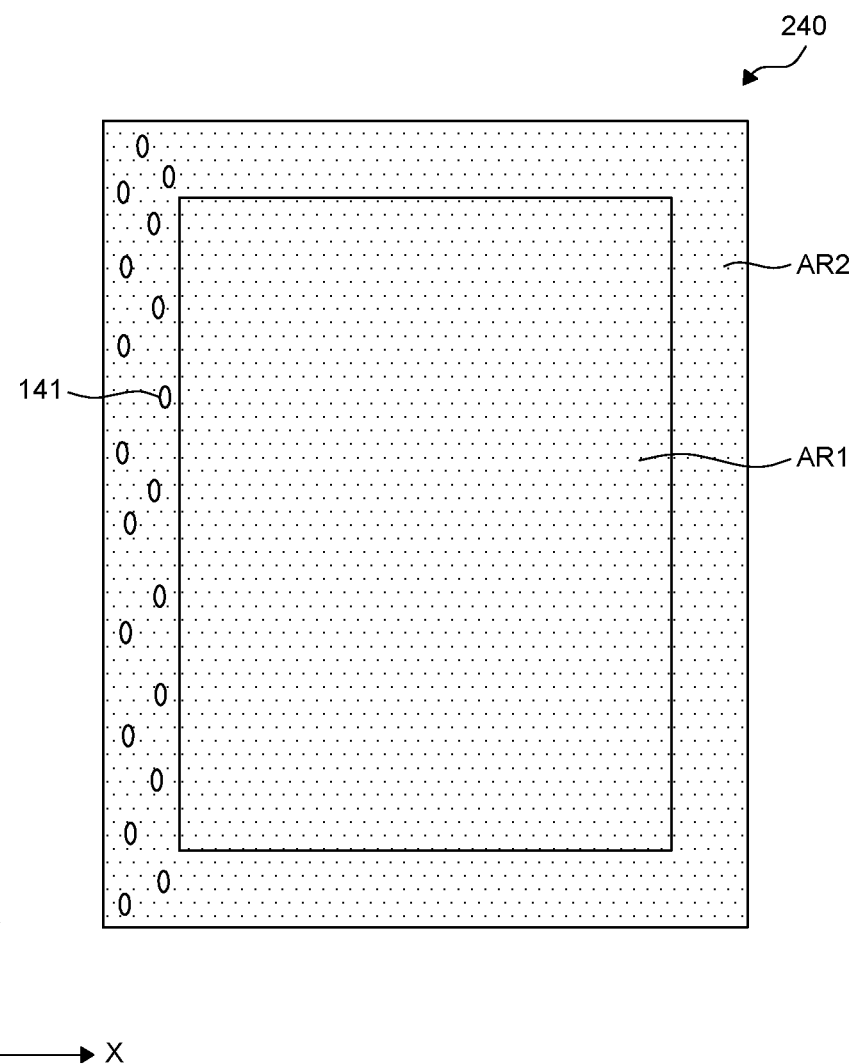
FIG. 4 is a top plan view of a resin layer according to another embodiment of the present disclosure.
Figure 5:
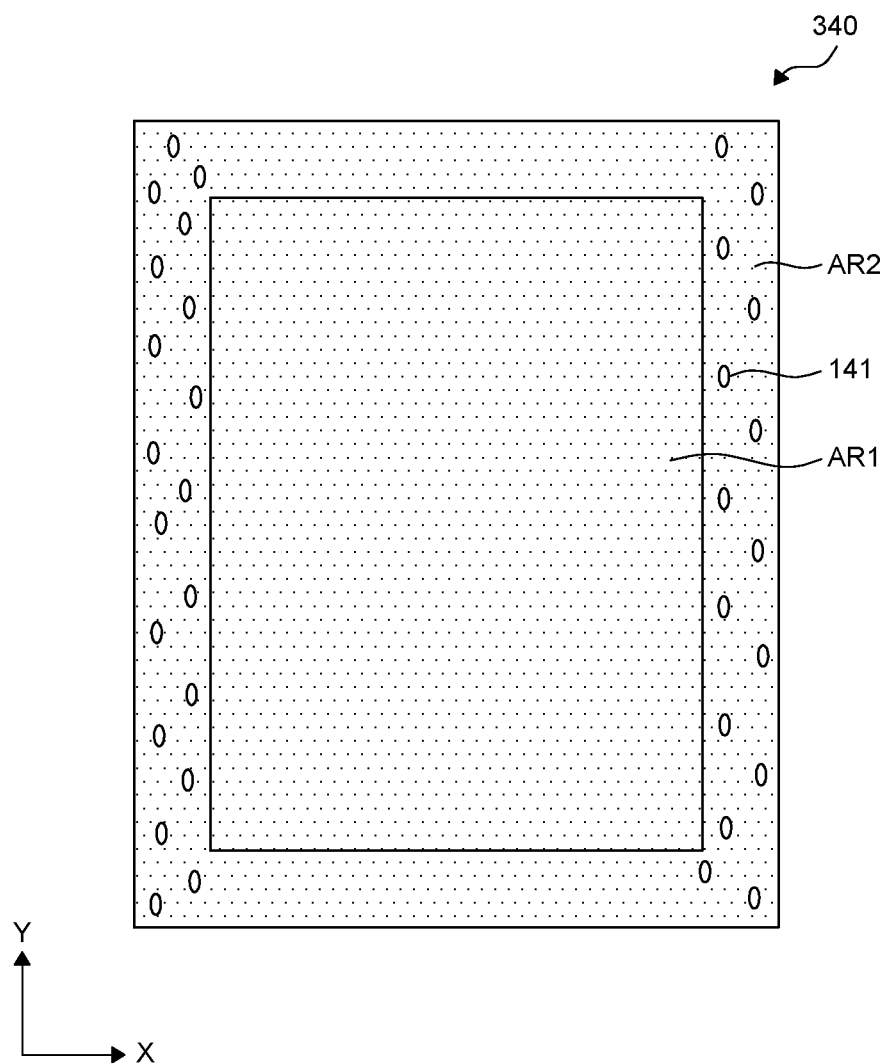
FIG. 5 is a top plan view of a resin layer according to still another embodiment of the present disclosure.
Figure 6:
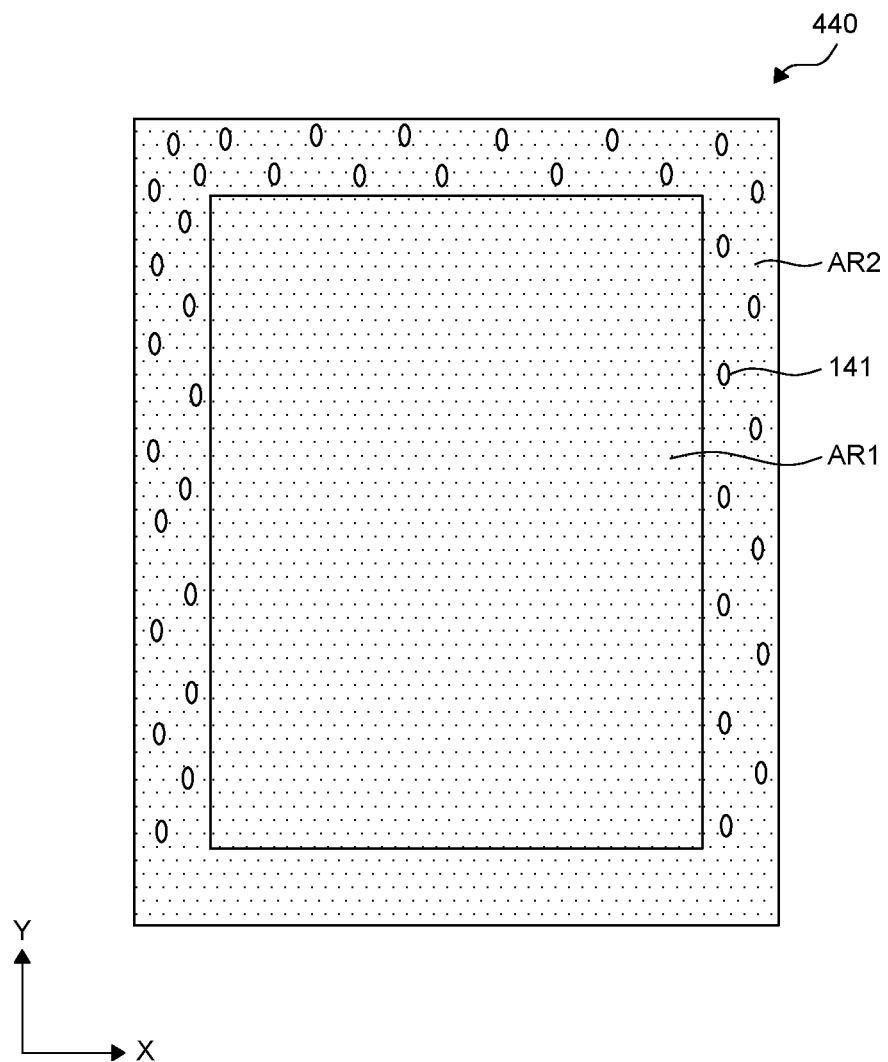
FIG. 6 is a top plan view of a resin layer according to yet another embodiment of the present disclosure.

FIGS. 4 to 6 are top plan views of the resin layer having the plurality of fine holes 141 according to various embodiments. Similarly to FIG. 3, in FIGS. 4 to 6, the X-axis and Y-axis directions correspond to the width and length directions of the resin layer, respectively.

FIG. 4 is a top plan view of a resin layer according to another embodiment of the present disclosure. Referring to FIG. 4, the plurality of fine holes 141 may be formed along a single side extending in a Y-axis direction (or X-axis direction) among the four sides that define the second region AR2 of the resin layer 240.

FIG. 5 is a top plan view of a resin layer according to still another embodiment of the present disclosure. Referring to FIG. 5, the plurality of fine holes 141 may be formed along two sides facing each other and extending in the Y-axis direction (or X-axis direction) among the four sides that define the second region AR2 of the resin layer 340.

FIG. 6 is a top plan view of a resin layer according to yet another embodiment of the present disclosure. Referring to FIG. 6, the plurality of fine holes 141 may be formed along two sides facing each other and extending in the Y-axis direction (or X-axis direction) and a single side perpendicular to the two sides and extending in the X-axis direction (or Y-axis direction) among the four sides that define the second region AR2 of the resin layer 440.

The breathability is improved as the number of fine holes 141 formed in the second region AR2 of the resin layers 140, 240, 340, and 440 increases. Therefore, the decomposed materials produced in the high-temperature, high-humidity environment may be smoothly discharged. That is, when the resin layer 140 having the structure illustrated in FIG. 3 in which the plurality of fine holes 141 are distributed in a large region is applied among the resin layers illustrated in FIGS. 3 to 6, it is possible to more effectively inhibit deterioration in brightness and occurrence of defect caused by the decomposed materials. In addition, the decomposed materials may be more smoothly discharged when the plurality of fine holes 141 are uniformly distributed to the entire second region AR2 in a condition in which the volume occupied by the plurality of fine holes 141 remains the same.

For example, a volume fraction of the region occupied by the fine holes 141 in the resin layer 140 may be 0.2 vol. % to 2.0 vol. %. In particular, for example, a volume fraction of the region occupied by the fine hole 141 may be 1.0 vol. % to 2.0 vol. %. In this case, the sufficient number of fine holes 141 are formed, such that the decomposed materials may be more quickly and easily discharged. Therefore, the display device 100 is more excellent in reliability.

Since the plurality of fine holes 141 are formed in the second region AR2 of the resin layer 140, the first region AR1 and the second region AR2 may have different physical properties.

For example, a porosity of the second region AR2 in which the plurality of fine holes 141 are formed is larger than a porosity of the first region AR1. Specifically, for example, the porosity of the first region AR1 may be 12 vol. % to 20 vol. %, and the porosity of the second region AR2 may be 18 vol. % to 30 vol. %. For reference, because the first region AR1 is made of silicon-based resin, the first region AR1 has a porosity at a predetermined level because of the nature of the silicon-based resin even though the plurality of fine holes 141 are not formed in the first region AR1. In a case in which the first region AR1 and the second region AR2 are made of silicon-based resin materials having the same curability, the porosity of the second region AR2 in which the plurality of fine holes 141 are formed is larger than the porosity of the first region AR1 in which the fine hole 141 is not formed.

For example, the moisture vapor transmittance rate of the second region AR2 may be 1.5 to 20 times the moisture vapor transmittance rate of the first region AR1. Since the second region AR2 in which the plurality of fine holes 141 are formed has a large porosity as described above, the second region AR2 has a higher moisture vapor transmittance rate than the first region AR1. Specifically, for example, the moisture vapor transmittance rate of the first region AR1 may be $1.0 \times 10^{-6}$ gcm$^{-1}$s$^{-1}$cmHg$^{-1}$ to $4.0 \times 10^{-6}$ gcm$^{-1}$s$^{-1}$cmHg$^{-1}$, and the moisture vapor transmittance rate of the second region AR2 may be $5.0 \times 10^{-6}$ gcm$^{-1}$s$^{-1}$cmHg$^{-1}$ to $5.0 \times 10^{-5}$ gcm$^{-1}$s$^{-1}$ cmHg$^{-1}$. However, the present disclosure is not limited thereto.

For example, a modulus of the second region AR2 may be smaller than a modulus of the first region AR1. Specifically, the modulus of the first region AR1 may be 30,000 Pa to 90,000 Pa, and the modulus of the second region AR2 may be 1,000 Pa to 10,000 Pa.

The following Table 1 shows a result of evaluating reliability of the display device in accordance with the modulus of the resin layer. The display device 100 according to Example 1 includes the first region AR1 and the second region AR2, and the second region AR2 includes the resin layer 140 having the plurality of fine holes 141. In this case, the modulus of the first region AR1 is 40,000 Pa, and the modulus of the second region AR2 is 9,000 Pa. A display device according to Comparative Example 1-1 is not divided into first and second regions. The display device according to Comparative Example 1-1 includes the resin layer having a modulus of 50,000 KPa without having the plurality of fine holes. A display device according to Comparative Example 1-2 is not divided into first and second regions. The display device according to Comparative Example 1-2 includes the resin layer having a modulus of 30,000 Pa without having the plurality of fine holes. The evaluation of reliability was performed on the respective display devices by using a luminous flux measurement device having an integrating sphere under a condition in which the temperature was 85° C., and the relative humidity was 85%. The luminous flux was measured before the display devices were stored in the high-temperature, high-humidity condition. Table 1 shows luminous flux maintenance rates with respect to time in the high-temperature, high-humidity condition.

TABLE 1

|  |  | Ex. 1 | | Com. Ex. 1-1 | Com. Ex. 1-2 |
|---|---|---|---|---|---|
|  |  | AR1 | AR2 | — | — |
| Modulus [KPa] |  | 40 | 9 | 50000 | 30 |
| Luminous flux | 0 hr | 100 | | 100 | 100 |
| maintenance rate | 250 hr | 95.6 | | 97.3 | 80.9 |
| [%] | 500 hr | 91.4 | | 87.6 | 76.8 |
| (85° C./relative | 750 hr | 89.7 | | 82.0 | 77.4 |
| humidity 85%) | 1000 hr | 89.5 | | 77.1 | 77.0 |

Referring to Table 1, it can be seen that the display device according to Example 1 having the plurality of fine holes 141 formed in the second region AR2 has a high luminous flux maintenance rate, and thus is excellent in reliability.

However, in the case of Comparative Example 1-1 including the resin layer having a large modulus, the initial luminous flux maintenance rate is best, but the luminous flux cannot be kept high but greatly deteriorates, such that the lowest luminous flux maintenance rate is shown. The resin layer according to Comparative Example 1-1 having a large modulus has better heat resistance and a lower moisture vapor transmittance rate than Example 1 or Comparative Example 1-2. Therefore, the decomposed materials produced from the peripheral components are inhibited from entering the resin layer, such that the initial reliability is high. However, it can be seen that the luminous flux maintenance rate rapidly decreases after 500 hours. This may mean that the decomposed materials remain in the backlight unit without being discharged, and the reliability is poor from a long-term point of view.

In addition, Comparative Example 1-2 includes the resin layer having a smaller modulus than the first region AR1 of Example 1. The resin layer having a small modulus has a high moisture vapor transmittance rate and thus is advantageous in discharging the decomposed materials introduced into the resin layer but has poorer reliability than Example 1.

That is, in order to improve the long-term reliability of the display device 100, the modulus of the resin layer 140 needs to be kept at an appropriate level, and the fine holes 141 need to be formed in the second region AR2 to facilitate the discharge of the decomposed materials.

Hereinafter, a method of forming the resin layer 140 including the plurality of fine holes 141 in the second region AR2 will be described.

For example, the resin layer 140 may be formed by the following method. First, the plurality of light sources 122, the upper solder resist PSRa, and the reflective plate 130 are formed on the printed circuit board 121. Next, a curing composition containing alkyl terminated polydimethylsiloxane-based resin, a curing catalyst, and a foaming agent is prepared. Next, the curing composition is applied onto the second region AR2 and preliminarily cured by being irradiated with light. The curing composition may be applied by a dispenser. However, the present disclosure is not limited thereto. For example, the preliminary curing may be performed by emitting UV rays by using a 365 nm LED emitter. However, the present disclosure is not limited thereto. Light sources with various wavelengths, such as a metal halide lamp, a mercury lamp, and a 405 nm LED emitter may be used in accordance with the catalyst being used. Next, thermal curing is additionally performed. In this case, the foaming agent is foamed at the same time when the alkyl terminated polydimethylsiloxane-based resin is cured by heat, such that the plurality of fine holes 141 are formed. Therefore, the second region AR2 is formed. For example, the foaming agent may be hydrocarbon. The foaming agent is decomposed in the thermal curing step while releasing gas, such that the fine holes 141 may be formed. A foaming agent, which may be foamed in a thermal curing temperature range, may be used as the foaming agent. For example, a foaming temperature of the foaming agent may be 80° C. to 120° C.

In addition, a foaming agent having a core-shell structure may be used to induce uniform foaming and inhibit the foaming agent from being foamed before the thermal curing step. For example, the foaming agent having the core-shell structure includes a core made of hydrocarbon, and a shell configured to surround the core. For example, the shell may be made of one or more materials selected from acrylonitrile, epoxy, and amide-based compound. As another example, a foaming agent having a hollow structure having a vacant core part may be used. The fine holes 141 may be formed by inducing a discharge of air in the core part by using thermal expansion in the thermal curing step. In the case in which the foaming agent having the core-shell structure is used, the thermal curing step may be performed at a high temperature of 150° C. to 200° C. in order to inhibit the shell from being thermally decomposed and remaining in the resin layer 140.

After the second region AR2 is formed first as described above, a curing composition containing alkyl terminated polydimethylsiloxane-based resin and a curing catalyst is applied into the first region AR1 and cured, such that the first region AR1 is formed. Therefore, the resin layer 140 including the first region AR1 and the second region AR2 having the plurality of fine holes 141 may be formed.

As another example, the resin layer 140 may be formed by the following method.

First, a curing composition containing alkyl terminated polydimethylsiloxane-based resin, hydroxy terminated polydimethylsiloxane-based resin, and a curing catalyst is applied onto the second region AR2 and preliminarily cured by being irradiated with light. The application of the curing composition and the preliminary curing may be performed in the same way as the above-mentioned method. Next, the preliminarily cured product is thermally cured. For example, when the cured product is heated at a temperature of 60° C. to 100° C., hydrogen gas is released by a reaction, like the following example reaction, such that the fine holes 141 may be formed. Therefore, the second region AR2 having the fine hole 141 is formed.

REACTION EXAMPLE

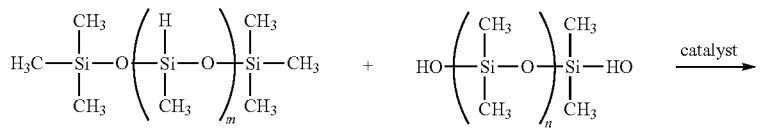

-continued

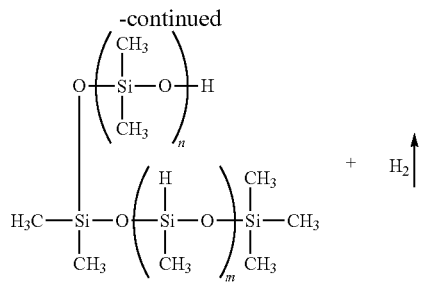

After the second region AR2 is manufactured as described above, the first region AR1 is formed in the same way as the above-mentioned method. The step of forming the first region AR1 is identical to the above-mentioned step. Therefore, a repeated description will be omitted.

As still another example, the resin layer 140 may be formed by using the following method by using silicon-based resin having a water contact angle of 80° to 100°.

First, a hydrophilic surface is formed on the surface of the reflective plate 130 on which the second region AR2 is to be formed. For example, the hydrophilic surface may be made of a hydrophilic material such as moisture, alcohol, glycerin, or glycol. A curing composition containing a curing catalyst and silicon-based resin having a water contact angle of 80° to 100° is applied onto the hydrophilic surface. Next, the curing composition is irradiated with UV rays and then thermally cured at a temperature of 60° C. to 80° C., such that the second region AR2 including the plurality of fine holes 141 is formed. When the display device is formed by the above-mentioned method, the fine holes 141 have uniform sizes and are uniformly distributed.

The first region AR1 is formed in the same way as the above-mentioned method. Therefore, a repeated description will be omitted.

The bottom cover 180 accommodates and supports the backlight unit. The reflective plate 130 and the printed circuit board 121 embedded with the plurality of light sources 122 are seated in the lower surface of the bottom cover 180. In addition, the bottom cover 180 may dissipate the heat generated from the light sources 122.

Meanwhile, FIG. 2 illustrates that the bottom cover 180 and the backlight unit are spaced apart from each other. However, additional components may be further disposed between the bottom cover 180 and the backlight unit. The additional components may include an adhesive tape for bonding, an adhesive material, a pad for absorbing impact, and the like. Mechanisms for modularizing the bottom cover 180, the backlight unit, and the display panel 110 may also be disposed.

The plurality of optical sheets 170 diffuse or collect the light emitted from the plurality of light sources 122 and allow the light having a uniform surface shape to enter the display panel 110. The plurality of optical sheets 170 may include a diffusion sheet, at least one light collecting sheet, and the like.

The diffusion plate 160 is disposed between the plurality of optical sheets 170 and the resin layer 140. The diffusion plate 160 diffuses the light emitted from the plurality of light sources 122 and allows the light, with high efficiency, to enter the plurality of optical sheets 170.

As necessary, an optical function film may be selectively disposed between the diffusion plate 160 and the resin layer 140. For example, the optical function film may be an anti-Mura film. However, the present disclosure is not limited thereto. The anti-Mura film suppresses glaring or scattering of the light emitted from the light source 122 and inhibit a situation in which the reflective plate 130 is visible. Therefore, it is possible to improve light extraction efficiency and provide excellent display quality.

Hereinafter, the effect of the present disclosure described above will be described in more detail with reference to Examples and Comparative Examples. However, the following examples are for exemplifying the present disclosure, and the scope of the present disclosure is not limited by the following examples.

Example 2-1

The reflective plate was formed on the printed circuit board on which the mini-LED array was mounted, and the silicone-based resin layer (175 mm wide, 400 mm long, 450 to 500 μm thick) as illustrated in FIG. 3 was formed through the molding process. When forming a second region (less than 1 mm in width) of the resin layer, fine holes were formed in the entire second region by foaming the foaming agent. The display device was manufactured by stacking the protective film, the diffusion plate, the optical sheet(s), and the display panel on the resin layer.

Examples 2-2 to 2-8

As shown in Table 2 below, the display devices according to Examples 2-2 to 2-8 were manufactured in the same way as Example 2-1, except that the region in which the fine holes are formed in the second region of the resin layer is changed.

For reference, in Table 2 below, '1X' means that the fine holes are formed along a single side extending in the X-axis direction among the four sides defining the second region of the resin layer, '2X' means that the fine holes are formed along two sides extending in the X-axis direction, '1Y' means that the fine holes are formed along a single side extending in the Y-axis direction, and '2Y' means that the fine holes are formed along two sides extending in the Y-axis direction.

Comparative Example 2

The display device having components identical to the components of Example 2-1 was manufactured, except that the step of forming the fine holes by using the foaming agent in the resin layer forming step is omitted.

Experimental Example

The reliability of the display devices according to Examples 2-1 to 2-8 and Comparative Example 2 was evaluated. First, the initial luminous flux of each of the display devices was measured by using an integrating sphere and a luminous flux measurer. Next, each display device was stored in a chamber with a temperature of 85° C. and a relative humidity of 85%, and the luminous flux was measured at 100 hr, 500 hr, and 1,000hr by using the same equipment. The initial luminous flux was set to 100%, and the luminous flux maintenance rate was calculated over time. The result is shown in Table 2 below.

TABLE 2

| Classification | | Ex. | | | | | | | Com. Ex. |
|---|---|---|---|---|---|---|---|---|---|
| | | 2-1 | 2-2 | 2-3 | 2-4 | 2-5 | 2-6 | 2-7 | 2-8 | 2 |
| Region in which fine holes are formed | | 2X2Y | 1X2Y | 2X1Y | 2Y | 2X | 1X1Y | 1Y | 1X | — |
| Luminous flux mainte- nance rate [%] | 0 hr | 100 | 100 | 100 | 100 | 100 | 100 | 100 | 100 | 100 |
| | 100 hr | 98.8 | 98.6 | 98.3 | 98.5 | 97.1 | 97.7 | 97.4 | 96.5 | 96.2 |
| | 500 hr | 96.1 | 93.9 | 93.0 | 92.1 | 91.4 | 91.8 | 90.1 | 87.3 | 85.5 |
| | 1000 hr | 94.3 | 92.4 | 91.1 | 90.0 | 89.3 | 88.8 | 87.9 | 85.2 | 82.0 |

Referring to Table 2, it can be seen that the display device of Comparative Example 2 including the resin layer having no fine hole has a good luminous flux maintenance rate until 100 hours, but the luminous flux maintenance rate decreases rapidly, such that the reliability is poorer than Examples 2-1 to 2-8.

In contrast, the display devices of Examples 2-1 to 2-8, including the fine holes in at least a part of the second area of the resin layer, are excellent in comparison with Comparative Example 2. In addition, referring to Table 2, it can be seen that there is a tendency in which the reliability becomes better as the region in which the fine holes are formed becomes wider or larger. In particular, it can be seen that in the case of Example 2-1 in which the fine holes are formed in the entire second region, the luminous flux is kept at a significant high level without greatly deteriorating even after the display device is stored for 1,000 hours under a high-temperature and high-humidity condition.

However, it can be seen that Example 2-5 and Example 2-6 are out of the tendency. Specifically, Example 2-6 is an example in which the fine holes are formed along the single side in the X-axis direction and the single side in the Y-axis direction. Example 2-5 is an example in which the fine holes are formed along the two parallel sides in the X-axis direction.

Because a length of the (vertical in FIGS. 3-6) side in the Y-axis direction is longer than a length of the (horizontal in FIGS. 3-6) side in the X-axis direction in the resin layer, the region in which the fine holes are formed is larger in Example 2-6 than in Example 2-5. However, it can be seen that the luminous flux maintenance rate of Example 2-5 is slightly higher. From this, it can be seen that it is effective in improving reliability not only when the plurality of fine holes are formed in consideration of a forming ratio of the fine holes in the second region, but also when the fine holes are uniformly distributed. It can be estimated that this is because the decomposed materials are not only formed in a particular region, but also formed randomly in a high-temperature, high-humidity environment. That is, the decomposed materials are randomly produced in the backlight unit. Therefore, the fine holes need to be uniformly distributed in the second region to easily discharge the decomposed materials.

The exemplary embodiments of the present disclosure can also be described as follows:

According to an aspect of the present disclosure, a display device comprises: an optional printed circuit board; a plurality of light sources (which may be disposed on the optional printed circuit board); an optional reflective plate disposed on the printed circuit board and having a plurality of through-holes respectively penetrated by the plurality of light sources; a resin layer disposed to cover the plurality of light sources and optically cover the reflective plate and optically configured to flatten a surface; and a display panel disposed on the resin layer and including a display area and a non-display area optically configured to surround the display area, wherein the resin layer comprises: a first region configured to overlap the display area; and a second region configured to overlap the non-display area, and wherein a plurality of fine holes are provided in at least a part of the second region.

An average diameter of the fine holes may be 1 nm to 10 μm.

A porosity of the second region may be larger than a porosity of the first region, the porosity of the first region may be 12 vol. % to 20 vol. %, and the porosity of the second region may be 18 vol. % to 30 vol. %.

A moisture vapor transmittance rate of the second region may be 1.5 to 20 times a moisture vapor transmittance rate of the first region.

A modulus of the first region may be 30,000 Pa to 90,000 Pa, and a modulus of the second region may be 1000 Pa to 10,000 Pa.

The resin layer may be made of silicon-based resin.

The first region of the resin layer may be made of alkyl terminated polydimethylsiloxane-based resin, and the second region of the resin layer may be made of alkyl terminated polydimethylsiloxane-based resin and hydroxy-terminated polydimethylsiloxane-based resin.

The first region of the resin layer may be made of alkyl terminated polydimethylsiloxane-based resin, and the second region of the resin layer may be made of alkyl terminated polydimethylsiloxane-based resin and foaming agent.

The first region of the resin layer may be made of alkyl terminated polydimethylsiloxane-based resin, and the second region of the resin layer may be made of silicon-based resin having a water contact angle of 80° to 100°.

The display device may further comprise an optical sheet disposed between the resin layer and the display panel; and an optical protective film disposed between the resin layer and the optical sheet, wherein the resin layer may fill a space between the plurality of light sources and the protective film.

A height from the printed circuit board to an uppermost end of the light source may be lower than a height from the printed circuit board to an uppermost end of the reflective plate.

According to another aspect of the present disclosure, a display device includes: a backlight unit comprising a light source, and a flattening resin layer covering the light source; and a display panel disposed on the resin layer and including a display area and a non-display area, wherein the resin layer comprises a first region configured to overlap the display area and a second region configured to overlap the non-display area, a plurality of fine holes being provided in the second region.

The plurality of fine holes may be uniformly distributed in the entire second region.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
a plurality of light sources;
a resin layer disposed to cover the plurality of light sources;
a reflective plate that is disposed on a printed circuit board and has a plurality of through-holes respectively penetrated by the plurality of light sources; and
a display panel disposed on the resin layer and including a display area and a non- display area,
wherein the resin layer comprises:
a first region configured to overlap the display area; and
a second region configured to overlap the non-display area, and
wherein a plurality of fine holes are provided in at least a part of the second region,
wherein a solder resist is disposed on the printed circuit board on which the plurality of light sources are disposed, the reflective plate covers the solder resist, and the reflective plate and the solder resist are respectively patterned to overlap each other, and
wherein a porosity of the second region is larger than a porosity of the first region, and
wherein a moisture vapor transmittance rate of the second region is larger than a moisture vapor transmittance rate of the first region.

2. The display device of claim 1, wherein an average diameter of the fine holes is 1 nm to 10 μm.

3. The display device of claim 1, wherein the porosity of the first region is 12 vol. % to 20 vol. %, and the porosity of the second region is 18 vol. % to 30 vol. %.

4. The display device of claim 1, wherein the moisture vapor transmittance rate of the second region is 1.5 to 20 times the moisture vapor transmittance rate of the first region.

5. The display device of claim 1, wherein a modulus of the first region is 30,000 Pa to 90,000 Pa, and a modulus of the second region is 1000 Pa to 10,000 Pa.

6. The display device of claim 1, wherein the resin layer is made of silicon-based resin.

7. The display device of claim 6, wherein the first region of the resin layer is made of alkyl terminated polydimethylsiloxane-based resin, and the second region of the resin layer is made of alkyl terminated polydimethylsiloxane-based resin and hydroxy-terminated polydimethylsiloxane-based resin.

8. The display device of claim 6, wherein the first region of the resin layer is made of alkyl terminated polydimethylsiloxane-based resin, and the second region of the resin layer is made of alkyl terminated polydimethylsiloxane-based resin and foaming agent.

9. The display device of claim 6, wherein the first region of the resin layer is made of alkyl terminated polydimethylsiloxane-based resin, and the second region of the resin layer is made of silicon-based resin having a water contact angle of 80° to 100°.

10. The display device of claim 1, further comprising:
an optical sheet disposed between the resin layer and the display panel; and
a protective film disposed between the resin layer and the optical sheet,
wherein the resin layer fills a space between the plurality of light sources and the protective film.

11. The display device of claim 1, wherein the resin layer is disposed to cover the plurality of light sources and the reflective plate and a surface of the resin layer is flatter than the plurality of light sources and the reflective plate.

12. The display device of claim 1, wherein a height from the printed circuit board to an uppermost end of the light source is lower than a height from the printed circuit board to an uppermost end of the reflective plate.

13. The display device of claim 1, wherein the non-display area is configured to surround the display area.

14. A display device comprising:
a backlight unit comprising:
a light source, and
a flattening resin layer covering the light source;
a reflective plate that is disposed on a printed circuit board and has a plurality of through-holes respectively penetrated by the plurality of light sources; and
a display panel disposed on the resin layer and including a display area and a non-display area,
wherein the resin layer comprises a first region configured to overlap the display area and a second region configured to overlap the non-display area, a plurality of fine holes being provided in the second region,
wherein a solder resist is disposed on the printed circuit board on which the plurality of light sources are disposed, the reflective plate covers the solder resist, and the reflective plate and the solder resist are respectively patterned to overlap each other,
wherein a porosity of the second region is larger than a porosity of the first region, and
wherein a moisture vapor transmittance rate of the second region is larger than a moisture vapor transmittance rate of the first region.

15. The display device of claim 14, wherein the plurality of fine holes are uniformly distributed in the entire second region.

16. A display device comprising:
a plurality of light sources;
a resin layer disposed to cover the plurality of light sources; and
a display panel disposed on the resin layer and including a display area and a non- display area, wherein the resin layer comprises:
a first region configured to overlap the display area; and
a second region configured to overlap the non-display area, and
wherein a plurality of fine holes are provided in at least a part of the second region, wherein a porosity of the second region is larger than a porosity of the first region, the porosity of the first region is 12 vol. % to 20 vol. %, and the porosity of the second region is 18 vol. % to 30 vol. %.

17. A display device comprising:
a plurality of light sources;
a resin layer disposed to cover the plurality of light sources; and
a display panel disposed on the resin layer and including a display area and a non-display area,
wherein the resin layer comprises:
a first region configured to overlap the display area; and
a second region configured to overlap the non-display area, and
wherein a plurality of fine holes are provided in at least a part of the second region,
wherein a moisture vapor transmittance rate of the second region is 1.5 to 20 times a moisture vapor transmittance rate of the first region.

18. A display device comprising:
a plurality of light sources;
a resin layer disposed to cover the plurality of light sources; and
a display panel disposed on the resin layer and including a display area and a non-display area,
wherein the resin layer comprises:
a first region configured to overlap the display area; and
a second region configured to overlap the non-display area, and
wherein a plurality of fine holes are provided in at least a part of the second region,
wherein a modulus of the first region is 30,000 Pa to 90,000 Pa, and a modulus of the second region is 1000 Pa to 10,000 Pa.

19. A display device comprising:
a plurality of light sources;
a resin layer disposed to cover the plurality of light sources; and
a display panel disposed on the resin layer and including a display area and a non-display area,
wherein the resin layer comprises:
a first region configured to overlap the display area; and
a second region configured to overlap the non-display area, and
wherein a plurality of fine holes are provided in at least a part of the second region,
wherein the resin layer is made of silicon-based resin, and
wherein the first region of the resin layer is made of alkyl terminated polydimethylsiloxane-based resin, and the second region of the resin layer is made of alkyl terminated polydimethylsiloxane-based resin and hydroxy-terminated polydimethylsiloxane-based resin.

20. A display device comprising:
a plurality of light sources;
a resin layer disposed to cover the plurality of light sources; and
a display panel disposed on the resin layer and including a display area and a non-display area,
wherein the resin layer comprises:
a first region configured to overlap the display area; and
a second region configured to overlap the non-display area, and
wherein a plurality of fine holes are provided in at least a part of the second region,
wherein the resin layer is made of silicon-based resin, and
wherein the first region of the resin layer is made of alkyl terminated polydimethylsiloxane-based resin, and the second region of the resin layer is made of alkyl terminated polydimethylsiloxane-based resin and foaming agent.

21. A display device comprising:
a plurality of light sources;
a resin layer disposed to cover the plurality of light sources; and
a display panel disposed on the resin layer and including a display area and a non-display area,
wherein the resin layer comprises:
a first region configured to overlap the display area; and
a second region configured to overlap the non-display area, and
wherein a plurality of fine holes are provided in at least a part of the second region,
wherein the resin layer is made of silicon-based resin, and
wherein the first region of the resin layer is made of alkyl terminated polydimethylsiloxane-based resin, and the second region of the resin layer is made of silicon-based resin having a water contact angle of 80° to 100°.

* * * * *